UNITED STATES PATENT OFFICE.

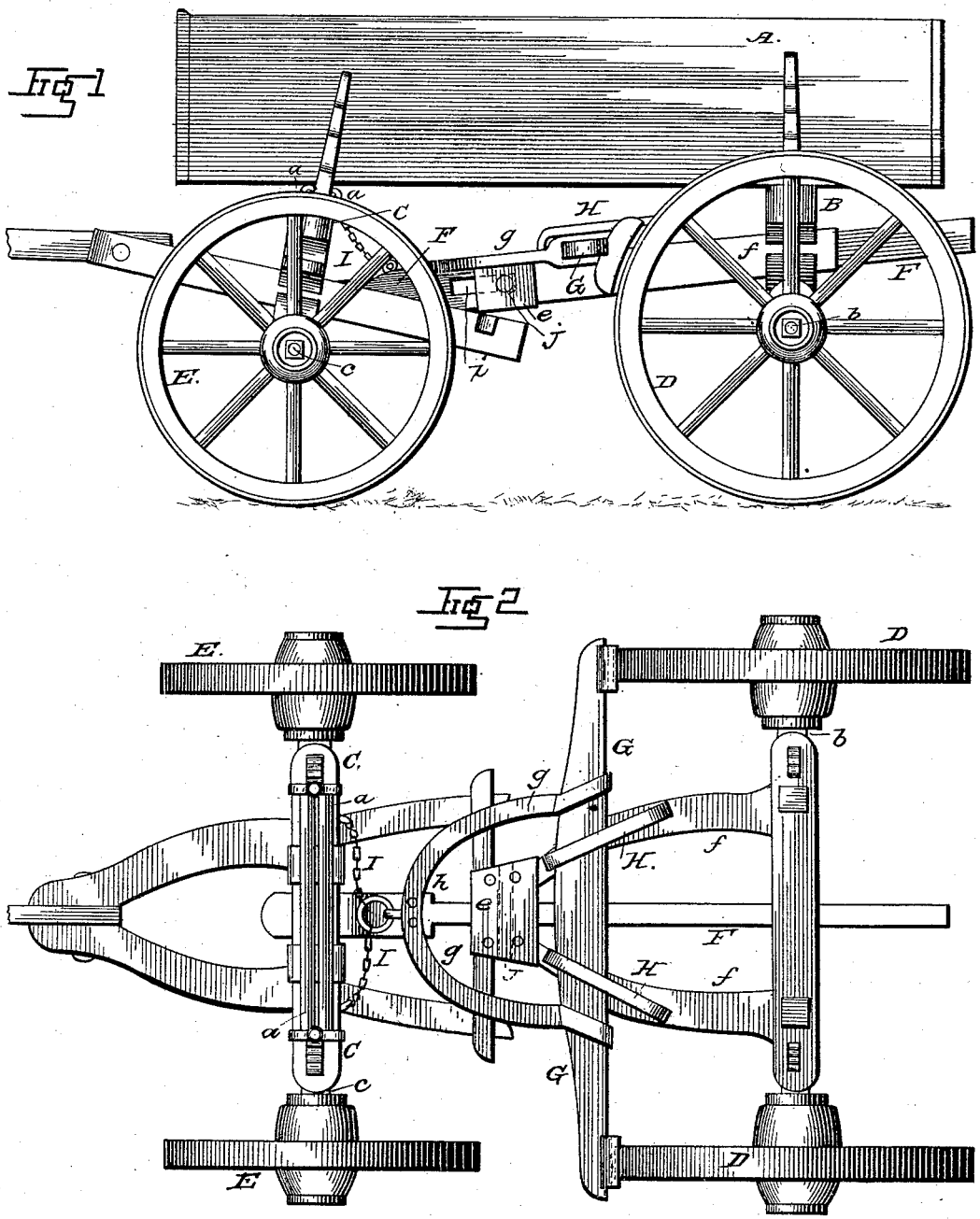

ABRAHAM W. SHUE, OF FISHERSVILLE, VIRGINIA.

WAGON-BRAKE.

SPECIFICATION forming part of Letters Patent No. 279,829, dated June 19, 1883.

Application filed March 12, 1883. (No model.)

*To all whom it may concern:*

Be it known that I, ABRAHAM W. SHUE, a citizen of the United States, residing at Fishersville, in the county of Augusta and State of Virginia, have invented a new and useful Improvement in Automatic Wagon-Brakes, of which the following is a specification.

My invention relates to that class of brakes which are attached to wagons and other vehicles to operate against the hind wheels by friction to retard the speed of the wagon in descending hills; and it consists in a certain construction and combination of parts whereby the brake is automatically applied with a pressure directly proportioned to the steepness of the descent and to the weight of the wagon and its load, as hereinafter described and claimed, reference being had to the accompanying drawings, in which—

Figure 1 is a side elevation of a wagon according to my invention; and Fig. 2 is a plan view, the wagon-body being removed.

A represents the body of the wagon, resting as usual on a bolster, B, of the hind axle, b, and on one or more rollers, a, on the bolster C of the forward axle, c. Thus the wagon-body will, without any special fastening, remain stationary on the hind axle; but it may easily slide to and fro on the forward roller, a. If the body were made up of loose planks, the position and effect would be the same.

D represents the hind wheels, and E the forward wheels.

F represents the reach, which is secured to the forward axle and passes back between the hounds f over the hind axle. These hind-axle hounds f are firmly bound together at their forward ends by an iron band, e, or some similar construction, which allows the reach free endwise play between the hounds.

G is the brake, consisting of a cross-bar mounted to slide freely on the hounds lengthwise with the wagon, and it is kept on its sliding seat by means of wide staples H, passing over it and secured to the hounds f. The brake is secured to the reach F by an iron brace, g, at h, and the reach is connected with the forward axle by means of a king-bolt, as usual. The forward bolster, C, may turn round upon the king-bolt; but it is kept practically square with the wagon-body, however much the forward axle may be cramped under it, by means of two brace-chains, I, secured at one end to said bolster, and at the other end to the reach. The hind axle is drawn by the reach, a slot, i, being made in it to receive a bolt, J, from the hounds f, the slot being elongated to permit the hind wheels to advance toward the forward wheels. This is assisted by the brake-bar G drawing against its staples H. Thus the brake is fixed directly or indirectly to the forward axle, while the hind axle is allowed some longitudinal motion on the reach, permitting the hind wheels to run forward when going down hill until their rims rub against the brakes, the forward axle being held back somewhat by the team. The steeper the hill is the more forcibly the hind wheels press forward against the brakes, and an increased weight of load, having a greater tendency to run down hill, will also bring the wheels more forcibly against the brakes. As soon as the weight of the wagon stops pushing forward and requires to be pulled, the forward axle will be drawn ahead, and with it the reach, and the brake will be drawn away from the hind wheels. The brake will not be needed and will not be applied unless there is forward pressure on the hind wheels. Thus my brake is practically automatic in its action and adaptation to the varying conditions of every-day use, and requires no attention whatever. Thus the great danger in descending steep hills is prevented, and no matter how ignorant or careless the driver may be he cannot endanger the wagon or its contents by letting it run down hill unchecked.

What I claim as my invention, and wish to secure by Letters Patent, is—

The forward axle, c, the reach F, secured thereto, and the brake G, secured upon the reach, in combination with the hind axle, b, the wheels D thereon, the hounds f, secured to the hind axle, the band e, binding the forward ends of the hounds beside the reach, and the broad staples H, fastened to the hounds over the brake, substantially as specified, whereby the reach and brake are permitted longitudinal motion relative to the hounds, hind axle, and wheels, yet the brake is firmly held to its duty of braking the hind wheels when they advance against the brake in going down hill, as specified.

ABRAHAM W. SHUE.

Witnesses:
SAMUEL LIFE,
SAMUEL EAVEY.